(12) United States Patent
Hu

(10) Patent No.: US 6,969,418 B1
(45) Date of Patent: Nov. 29, 2005

(54) PHASE ENHANCED GAS-LIQUID ABSORPTION METHOD

(76) Inventor: Liang Hu, P.O. Box 321, Hampton, VA (US) 23669

( * ) Notice: Subject to any disclaimer, the term of this patent is extended or adjusted under 35 U.S.C. 154(b) by 149 days.

(21) Appl. No.: 10/425,500

(22) Filed: Apr. 29, 2003

Related U.S. Application Data

(63) Continuation-in-part of application No. 09/850,013, filed on May 7, 2001, now abandoned.

(51) Int. Cl.⁷ .............................................. B01D 53/14
(52) U.S. Cl. ..................... 95/235; 95/236; 96/252; 261/18.1
(58) Field of Search ................... 95/235, 236; 96/251, 96/252, 253, 281; 261/18.1; 423/220, 226, 423/228, 229

(56) References Cited

U.S. PATENT DOCUMENTS

| | | | |
|---|---|---|---|
| 2,501,114 A * | 3/1950 | Whaley, Jr. ................. 261/18.1 |
| 2,747,680 A * | 5/1956 | Kilpatrick ..................... 95/188 |
| 3,502,428 A * | 3/1970 | Gelbein et al. ............. 423/229 |
| 3,899,312 A * | 8/1975 | Kruis et al. .................... 62/625 |
| 5,797,981 A * | 8/1998 | Collin et al. ................... 95/174 |
| 6,228,145 B1 * | 5/2001 | Falk-Pedersen et al. ....... 95/44 |
| 6,290,754 B1 * | 9/2001 | Peytavy et al. ............... 95/172 |

OTHER PUBLICATIONS

R.H. Niswander et al.; A More Energy Efficient Product for Carbon Dioxide Separation; In Separation Science & Technology. 28(1-3). pp 565-578 (1993) Mercel Dekker, Inc.

Arthur L. Koh & Fred C. Riesenfeld, In Gas Purification, pp. 233-236. Gulf Publishing Co (1985).

* cited by examiner

*Primary Examiner*—Frank M. Lawrence

(57) ABSTRACT

A phase enhanced gas-liquid absorption method is disclosed. By adding an organic mixture or compound into a conventional gas-liquid system, the organic mixture forms a layer between the gas mixture and the liquid carrier. In this modified system, the absorption rate of the gas is significantly increased by the organic mixture, which plays a role of transporting the gas from the gas mixture to the liquid carrier.

38 Claims, 9 Drawing Sheets

PHASE ENHANCED GAS-LIQUID ABSORPTION METHOD

CROSS-REFERENCE TO RELATED APPLICATIONS

This patent application is a continuation-in-part application of the application Ser. No. 09/850,013, filed May 7, 2001, and now abandoned, titled "Method for Gas Separation by Phase Enhanced Gas-liquid Absorption, which is incorporated herein in its entirety.

FIELD OF THE INVENTION

This invention relates to the method for gas separation. In particular, this invention relates to a method of gas separation by phase enhanced gas-liquid absorption.

BACKGROUND OF THE INVENTION

Gas-liquid absorption method is still a powerful tool for separating and purifying gas. Absorbents commonly used in the liquid solution for separating carbon dioxide include alkanolamines, alkaline salt and their modified forms. To improve the performance, a chemical compound may be added to the liquid phase, which can react with the gas to form other compounds. A chemical reaction may have two beneficial effects on the absorption process. First, it can increase the carrying capacity of the liquid solution. Second, it can reduce mass transfer resistance or increase mass transfer coefficient. Both effects contribute to an increased absorption rate. However, such chemical reactions may hinder the release of the absorbed gas from the liquid solution.

R. H. Niswander, D. J. Edwards, M. S. DuPart, and J. P. Tse, in an article entitled "A More Energy Efficient Product for Carbon Dioxide Separation", Separation Science and Technology. 28, no. 1–3, (January 1993) pp. 565–578 suggested that aqueous solution of alkanolamines was widely used to separate carbon dioxide from other gases to meet the requirement of very low residual carbon dioxide concentration. Amine compounds such as monoethanolamine (MEA) and diethanolamine (DEA) can undergo side reactions with carbon dioxide to form a variety of degradation compounds. These compounds reduce the performance of the solvent, cause corrosion on the reaction vessel, and increase energy consumption of the system.

Another popular method for separating carbon dioxide employs an alkaline salt solution as an absorbent. Sodium carbonate and potassium carbonate are the most commonly used materials. Absorption process can be divided into two types based on temperature at which the process is carried out: ambient temperature (70–100° C.) and elevated temperature (approximating regeneration temperature). Slow absorption rates at an ambient temperature result in a low efficiency of carbon dioxide recovery. Therefore, a large amount of steam is necessary to regenerate the absorbent. In comparison, absorption at an elevated temperature such as in Benfield Process overcomes some of the disadvantages observed in the ambient-temperature process. By increasing the temperature of the absorption process, both the absorption rate and the absorbent's gas-holding capacity increase.

Several modifications have been adopted in some processes to accelerate the absorption rates of carbon dioxide. In those processes, activators or promoters are added into carbonate solutions. Those processes include Benfield Process, the Cartacarb Process, and the Glammarco-Vetrocoke process. Arthur L. Kohl and Fred C. Riesenfeld in their book "Gas Purification", Gulf Publishing Company (1985) at page 235, discuss the effects of promoters and activators on the carbon dioxide absorption rate and vapor-liquid equilibria. Compared with hot potassium carbonate solutions, diethanolamine (DEA) and sterically hindered amines were found to be very effective in increasing the absorption rate of carbon dioxide. However, the partial pressure of carbon dioxide at equilibrium decreases after an activator is added into the carbonated solution. This means that it is more difficult to recover carbon dioxide from the activated solution than from a solution containing no activator.

It is therefore apparent there is a need for a method that exhibits a high absorption rate without increasing the difficulty in regenerating the absorbent.

SUMMARY OF THE INVENTION

The present invention is directed to an improved method and system for separating and purifying gas using gas-liquid absorption process.

According to this invention, the method was carried out in a closed or partially closed vessel, where a liquid carrier, an organic mixture (or organic compound), and a gas mixture containing a gas to be absorbed were introduced from an inlet. Since the organic mixture is immiscible or at least partially immiscible with the liquid carrier, the organic mixture forms a layer or small parcels between the liquid carrier and the gas mixture. The organic mixture in the reaction vessel improved mass transfer efficiency of the system and increased the absorption rate of the gas significantly. The organic mixture served as a transportation medium. The gas was finally accumulated in the liquid carrier as in a conventional gas-liquid separation system.

In one aspect, the method of the present invention could be used to remove an impurity gas from a gas mixture of interest or to collect a gas of interest from a gas mixture at improved efficiency. In another aspect, the presence of the organic layer did not hinder the regeneration of the liquid carrier or recovery of the gas because the organic layer was removed by a settler after the absorption process was completed. Yet in another aspect, the system exhibited increased gas-liquid separation efficiency, thereby reducing the costs of operation and maintenance.

It is apparent that the liquid carrier may be an organic compound or mixture while the transportation medium may be an aqueous solution, which exists between the gas mixture and the liquid carrier.

It is to be understood that both the foregoing general description and the following detailed description are exemplary and are intended to provide further explanation of the invention as claimed.

DETAILED DESCRIPTION OF THE INVENTION

Definitions and Basic Concepts

Absorption is a process by which one or more components of a gas mixture are transferred to a liquid where it is soluble. The operation of absorption can be categorized on the basis of the nature of the interaction between absorbent and absorbate into the following two types, traditionally:

Physical absorption. The component being absorbed in physical absorption is more soluble in the liquid absorbent than other gas components with which it is mixed, but does not react chemically with the absorbent.

Chemical absorption. Chemical absorption is characterized by the occurrence of a chemical reaction between the gas component being absorbed and a component in the liquid to form a compound.

Phase enhanced absorption or Phase enhanced gas-liquid absorption. In the study leading to the present invention, it was found that by adding an organic compound or mixture into a gas-liquid (frequently, an aqueous phase) absorption system, the absorption rate of the gas can increase significantly. Therefore, the process occurring in this system is referred to as phase enhanced gas-liquid absorption. In phase enhanced gas-liquid absorption, more than one liquid phase is involved in absorbing the gas. One of the liquids serves as an absorbing carrier where the gas is finally accumulated. The other liquid, the transportation layer, plays a role of transporting the gas from the gas mixture to the carrier and increasing the absorption rate of the gas.

Mass Transfer Equation

Mass transfer equation for physical absorption can be expressed:

$$N_A = k_L(C_A^* - C_A)$$

Where $N_A$ is the rate of absorption per unit area of surface. $k_L$ is a physical mass transfer coefficient. $C_A^*$ is the concentration of dissolved gas corresponding to the equilibrium partial pressure of the gas at the interface between a gas and a liquid. $C_A$ is the average concentration of dissolved gas in the bulk of the liquid.

For chemical absorption, the mass transfer equation can be expressed:

$$N_A = E_R k_L(C_A^* - C_A)$$

Here, $E_R$, an enhancement factor, can be identified with the ratio of rate of absorption in the presence of a reaction to the rate of absorption without a reaction.

Similarly, for a phase-enhanced absorption, the mass transfer equation can be expressed:

$$N_A = E_p k_L(C_A^* - C_A)$$

Here, $E_p$ can be identified with the ratio of the rate of absorption in the presence of transportation layer to the rate of absorption without the transportation layer.

Mass Transfer Model for Phase Enhanced Absorption

Figure 1:
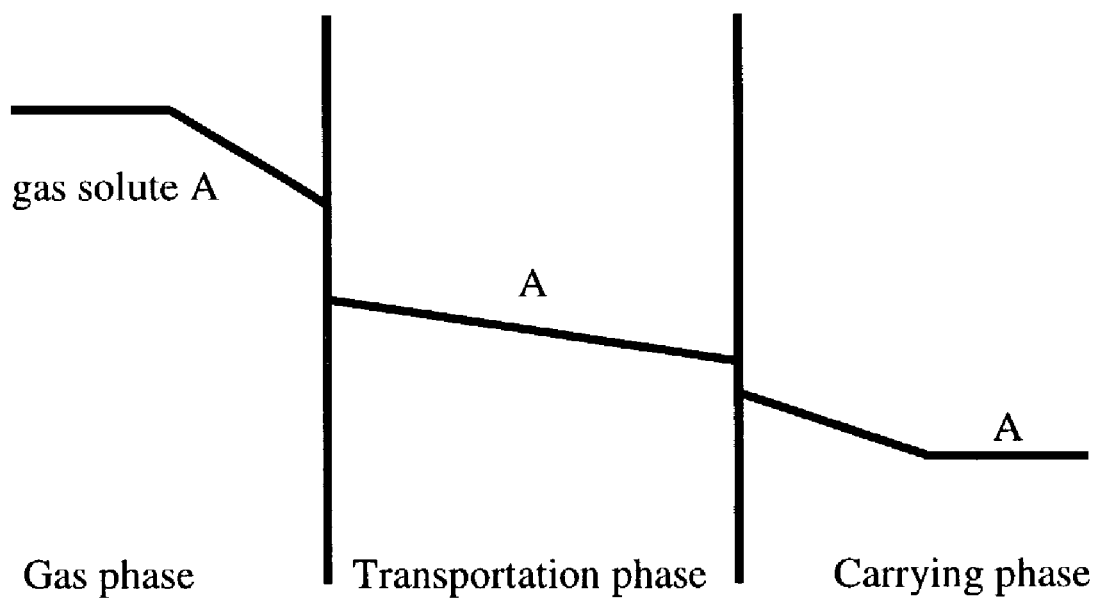
FIG. 1 is a schematic diagram of mass transfer model.

It is discovered that overall absorption rate is significantly improved by the presence of the transportation layer between the gas and the carrier. Mass transfer of phase enhanced gas-liquid absorption can be described as follows:

When a gas contacts the transportation layer, it is absorbed. The absorption is either physical or chemical. The gas dissolved in the transportation layer passes the interface between the transportation layer and the liquid carrier, and then enters the liquid carrier. In the liquid carrier, the gas may dissolve to become part of the solution or react with other compounds to form new compounds. The function of the transportation layer is to deliver the gas from the gas mixture to the liquid carrier and to increase the absorption rate. In film theory, the mass transfer model of phase enhanced gas-liquid absorption can be shown in FIG. 1.

The Basic System

Figure 2:
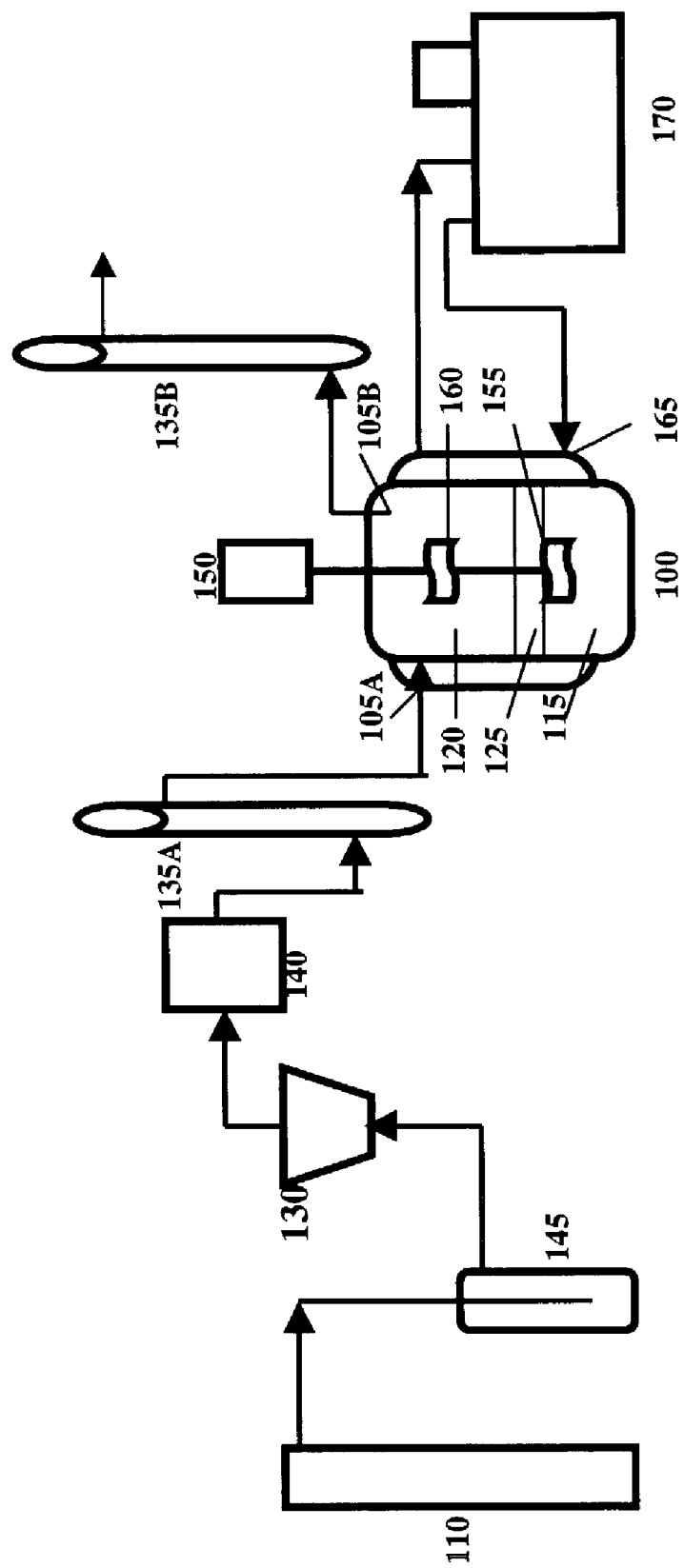
FIG. 2 is a flow diagram showing the basic components of the system.

According to one embodiment of the present invention (FIG. 2), the system contained a reaction vessel 100, which was closed or partially closed. The reaction vessel 100 had at least one inlet (105A and 105B). One of the inlets was connected to a gas source 110, perhaps in a gas tank, through a pipe (It may contain optional components along the pipe line as shown in FIG. 2). A liquid carrier 115, a gas mixture 120, and a transportation medium 125 were introduced into the reaction vessel 100 from one of the inlets. The liquid carrier 115 settled at the bottom of the reaction vessel 100 while the gas mixture 120 occupied the space over the liquid carrier 115. The transportation medium 125 existed as a layer or parcels between the liquid carrier 115 and the gas mixture 120.

The reaction vessel 100 may be a container of any shape. When the absorption system is used to purify a gas, it is desirable for the system to be airtight. Preferably, the reaction vessel 100 has a shape favorable for forming a large interface area between the gas mixture 120 and the transportation layer 125 and between the transportation layer 125 and the liquid carrier 115.

The transportation layer 125 must exist as a layer or small parcels between the gas mixture 120 and the liquid carrier 115 to ensure that it will play a role of transporting the gas of interest to the liquid carrier 115. The thickness of the transportation layer 125 may be anywhere from the thinnest layer which can be formed to the thickest layer which is possible, preferably in the range from 0.1 mm to 50 cm. When the transportation layer 125 is very thin, the designer of the system should consider its partial solubility even though it is immiscible with the liquid carrier 115. Likewise, if the transportation layer 125 is thick, it retains a greater amount of the gas of interest, which will not get into the liquid carrier 115. The ratio of the transportation layer 125 to the liquid carrier 115 may be from 1/1000 to 1000/1 by volume.

If the system is designed for removing a gas of interest from the gas mixture 120, the thickness of the liquid carrier 115 is not critical. Increasing the thickness or volume of the liquid carrier 115 may increase its capacity of absorbing the gas but decrease the absorption rate of the gas. Conversely, if the layer of the liquid carrier 115 in the reaction vessel 100 is very thin, its carrying capacity is limited. Therefore, a designer of the system needs to consider those two factors in determining the thickness of the liquid carrier 115. If the system is used to add a gas into the liquid carrier 115 or to collect a gas of interest from the gas mixture 120 through the liquid carrier 115, consideration is given to the availability of the gas, the ratio of the gas to the liquid carrier 115, the costs of the liquid carrier 115, the time and costs for regenerating the liquid carrier 115. When a given objective is well set and other variables are known, it would be obvious to one skilled in the art in selecting a proper thickness. Additional factors may be considered for specific applications. Generally, the amount of the liquid carrier 115 depends upon the amount of the gas to be absorbed and the costs of regenerating the gas.

The liquid carrier 115 for target gas carbon dioxide was an aqueous solution while the transportation layer 125 was formed of an organic compound or mixture, which existed as a layer or small parcels between the gas mixture 120 and the liquid carrier 115. Conversely, the liquid carrier 115 may be an organic mixture or compound, which settles at the bottom of the reaction vessel 100 while the transportation layer 125 may be an aqueous solution, which exists between the liquid carrier 115 and the gas mixture 120. This reversed phase system may be useful for absorbing gases, which are more compatible with an aqueous transportation layer.

Absorption may occur at any temperature from 1 to 500° C. except that it is limited by the boiling points of the liquid carrier 115 and the transportation layer 125 under a given pressure. In addition, the operating temperature cannot be higher than any temperature at which any of the material components in the liquid carrier 115 or in the transportation layer 125 decomposes. Pressure may be elevated or decreased to meet particular needs. By increasing the pressure of the reaction vessel 100, the boiling points of the liquid carrier 115 and the transportation layer 125 will be increased, allowing the system to work at higher temperatures. Also, an increase in pressure inside the reaction vessel 100 will favor the absorption process because absorption results in a decrease in the volume of the gas mixture.

The method may be used to separate a gas from a gas mixture. When a gas is identified as the target for a given application, the liquid carrier 115 must be one that is able to selectively absorb the gas with a higher absorption coefficient than to absorb the rest of the gas components in the gas mixture. Many of such gas-liquid pairs are known. Examples include $CO_2$, $SO_2$, $H_2S$, and COS. However, the method is not limited to those gases. It will be equally applicable to newly discovered gas-liquid systems. The target gas may have purity or content from about 0.001% to 100%.

Many optional components may be connected to the inlet through pipes. Optionally, the system may contain a flow-regulating device 130 for controlling the flow rate of the gas mixture 120 or flow monitoring devices 135A and 135B for measuring the flow rate of the system. Optionally, the system may contain a moisture adjustment device 140 for treating the gas mixture 120 for the purpose of adjusting its moisture. In addition, the system may also contain a pressure stabilizer 145. To operate the system at further high temperatures, other heating devices may be used. Optionally, the system may be pressurized by controlling the amount of gas retaining in the reaction vessel 100, as predicted by the ideal gas law. It is also possible to run the absorption process at a pressure lower than the atmospheric pressure. Because absorption results in a reduction of volume, it is necessary to maintain the amount of the gas mixture 120 for the reaction vessel 100 in order to maintain a constant pressure at a given temperature.

Optionally, the reaction vessel 100 may contain a motor 150 and agitating blades 155, 160, respectively for the liquid carrier 115 and the gas mixture 120. The agitating blade 155 within the liquid carrier 115 may be used to promote the dispersion and diffusion of the absorbed gas while the agitating blade 160 in the gas mixture 120 may be used to promote the dispersion and diffusion of absorbed gas to the transportation layer 125. If the transportation layer 125 is sufficiently thick, an agitating blade (not shown in FIGS) may also be used to promote the dispersion or diffusion of the absorbed gas. Optionally, the reaction vessel 100 may contain a water jacket 165, which may be connected to a water bath 170.

The Pathway of the Gas (1) The gas transfers from the bulk gas mixture to the interface between the gas and the transportation layer.

(2) The gas transfers from the interface between the gas mixture and the transportation layer to the interface between the transportation layer and the liquid carrier. In the transportation layer, the gas may react with other components or just simply dissolves physically without reacting with other components.

(3) The gas at the interface between the transportation layer and the liquid carrier transfers into the bulk liquid carrier. Like in the transportation layer, the gas may react with other components in the liquid carrier or simply dissolve physically without reacting with any component.

EXAMPLE 1

An Absorption System

Figure 3:
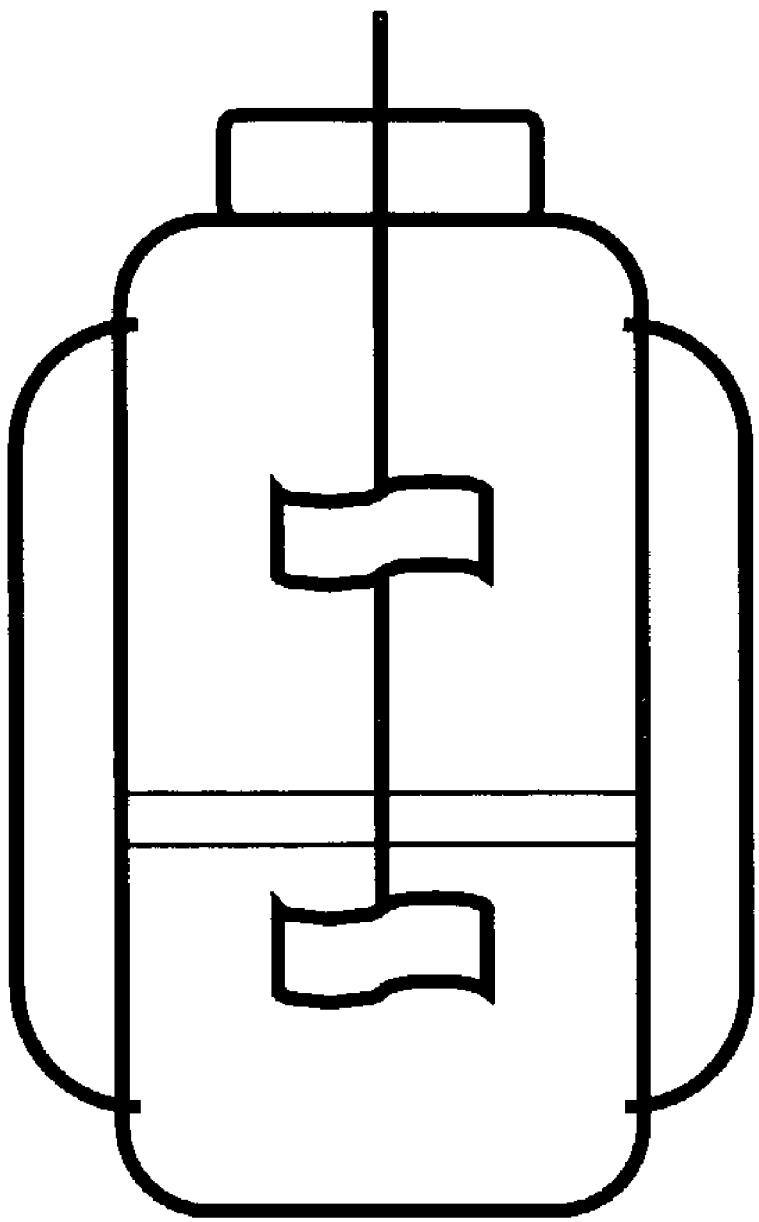
FIG. 3 is a schematic diagram of the stirring cell used as a reaction vessel.

In this particular example of a phase enhanced gas-liquid absorption system, a stirring cell was used as a reaction vessel. The structure of the cell is shown in FIG. 3. The stirring cell was made of glass with 100 mm inner diameter and 130 mm depth. Two agitating blades, one for the liquid carrier and the other for the gas mixture, were driven by a direct-current motor. The speeds of the agitating blades were determined by a laser meter. The temperature of the reaction vessel was controlled by a water jacket (not shown).

Figure 4:
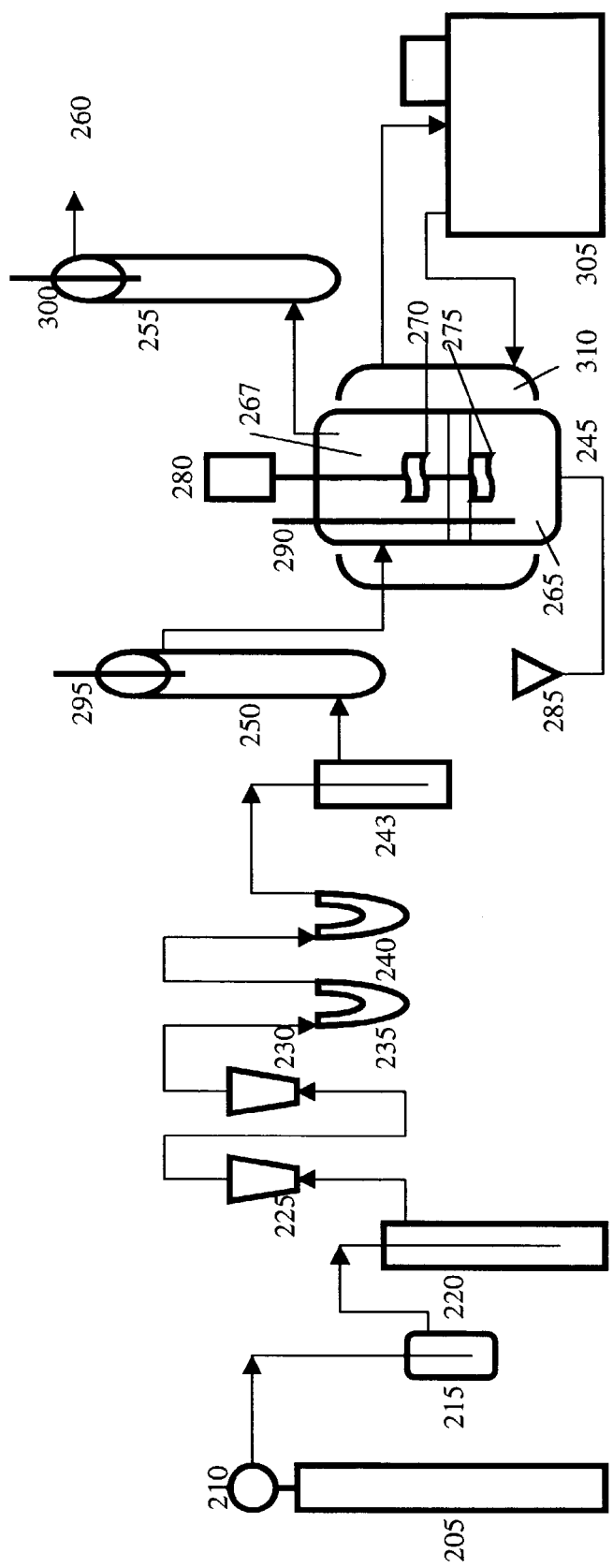
FIG. 4 is a schematic diagram of the system used for absorbing carbon dioxide in accordance with the present invention.

FIG. 4 is a flow chart of the system. Carbon dioxide from a cylinder 205 passed through a regulator 210, a buffer bottle 215, and a pressure stabilizing tube 220. Gas flow rate was controlled and measured by rotating flow meters 225, 230. A gas cleaning system consisted of U tubes 235, 240. The U tube 235 was filled with silicon gel while the U tube 240 contained active carbon. The gas was saturated with moisture by a bottle 243 which contained the same solution as that in the reaction vessel 245 before it entered the reaction vessel 245. The gas was measured by foam film flow meters 250, 255 before it entered and after it exited from the reaction vessel 245. After a measurement was made, the gas 267 was released from the liquid carrier 265. The agitating blades 270 and 275 (FIG. 3) in the reaction vessel 245 were driven by a motor 280. A funnel 285 was used to fill the liquid carrier into the reaction vessel 245. A thermometer 290 was used to measure the temperature of the liquid carrier 265. Thermometers 295 and 300 were used to measure the temperature of the foam film flow meters 250, 255. A thermostat-controlled water-bath 305 provided constant-temperature water to the water jacket 310 of the reaction vessel 245.

The experiments were conducted at room temperature (25° C.) and under 1.0 atm. Gas to be absorbed (e.g., the target gas) was carbon dioxide with a purity being higher than 99.9%. A liquid carrier and an immiscible organic mixture were introduced into the reaction vessel. The organic mixture, which existed between the liquid carrier and the gas, was made up of Alamine 336 (Tri-C8-C10-Alkyl amines) and 2-ethylhexyl alcohol in 1:1 ratio by volume (the ratio may be from 100/1 to 1/100 by volume). The liquid carrier was a sodium formate (400 g/l) aqueous solution. Absorption was allowed to proceed at a semi-continuous basis and carbon dioxide was allowed to pass through the system continuously. The liquid carrier was replaced for each new run of experiments. The liquid carrier and the gas were agitated, respectively by two agitating blades. The agitating speeds and the ratio of the liquid carrier to the organic mixture were specified for each experiment.

EXAMPLE 2

Analytical Method for Determining Absorbed Gas for the System of Example 1

The absorption rate of carbon dioxide at time t was determined by the difference of flow rates at the inlet and outlet of the reaction vessel, which were measured by the foam film flow meters 250 and 255. From the results of the measurements over a given time period, the relationship between the absorption rate r and time t was established. By integrating the absorption rate r over time t for the time period, the total amount of carbon dioxide absorbed in the liquid phase was obtained.

The concentration of carbon dioxide in the liquid carrier can be determined by using the ideal gas law. Carbon dioxide was collected upon being released from the liquid carrier by adding sulfuric acid. The mass of carbon dioxide was then computed. The mass of carbon dioxide obtained from integrating the absorption rate r over time t should be equal to the mass of carbon dioxide computed according to the ideal gas law for a given run of experiment. If a relative error for a run was higher than 5%, the data for that run of experiment was discarded.

EXAMPLE 3

The Results of the $CO_2$-sodium Formate Aqueous Solution Absorption System

In this example, two experiments were conducted. In the first experiment, carbon dioxide was absorbed by 280 ml sodium formate aqueous solution (400 g/l) and 20 ml organic mixture of Alamine 336 and 2-ethylhexyl alcohol (1:1 by volume). In the second experiment, carbon dioxide was absorbed by 300 ml sodium formate aqueous solution (400 g/l) directly.

In the first experiment, 280 ml sodium formate aqueous solution (400 g/L) and 20 ml liquid organic mixture were added into the reaction vessel. The liquid organic mixture, which was immiscible with the aqueous solution, formed a layer, as a second liquid phase, on top of the liquid carrier. The liquid carrier was agitated gently to facilitate the diffusion or dissolving of the gas. Agitating was sufficiently gentle so the convection moment it created did not break or destroy the layer of the liquid organic mixture. Carbon dioxide from the gas had to pass through the layer of the organic mixture in order to enter the aqueous solution. In the second experiment, 300 ml sodium formate aqueous solution (400 g/L) was introduced into the reaction vessel. No liquid organic mixture was added. Both experiments were conducted under the same experimental conditions: temperature=25° C., pressure=1.0 atm, agitation speed=250 rpm, and the concentration of carbon dioxide=99.9% by volume.

Figure 5:
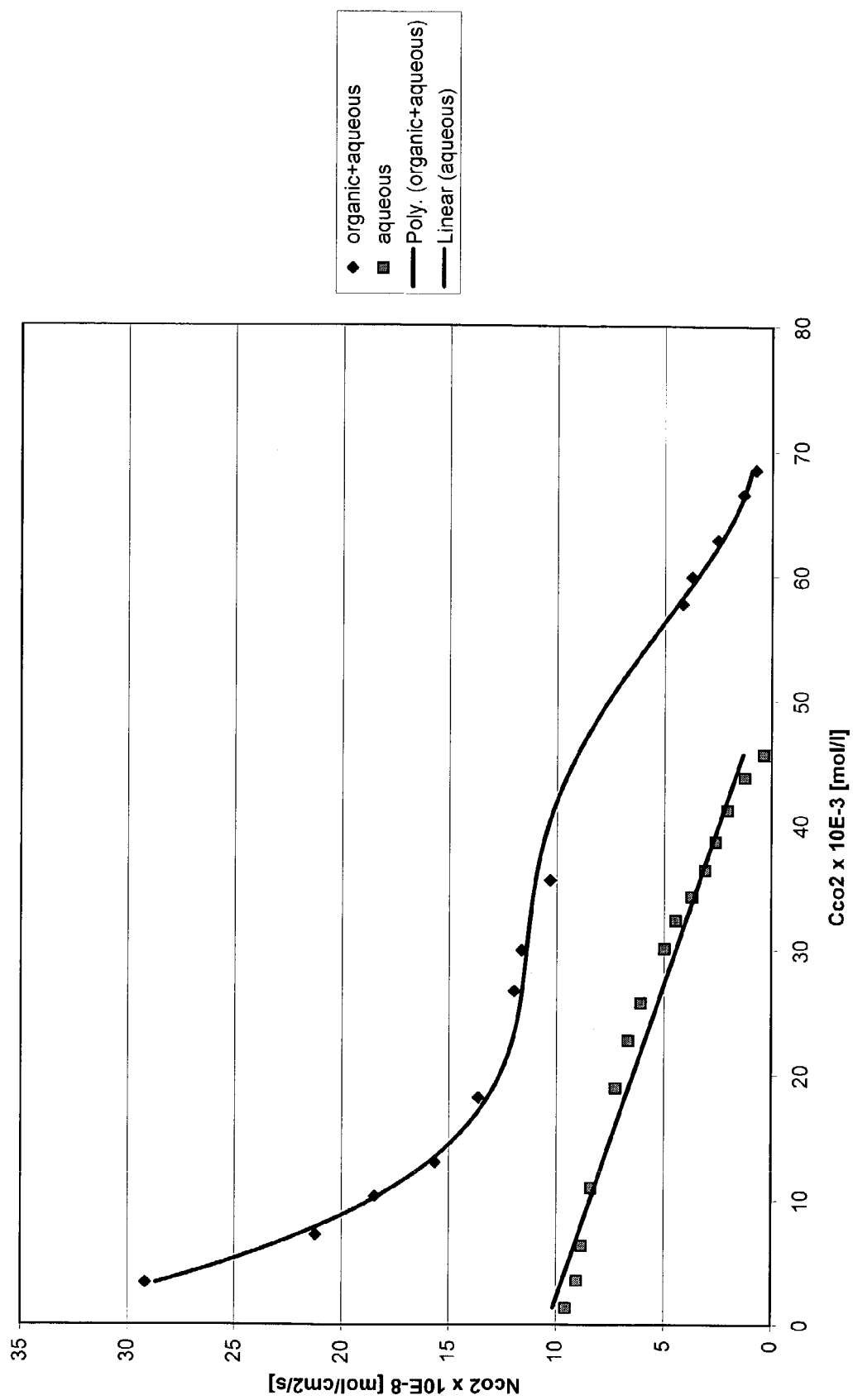
FIG. 5 shows the absorption rates of carbon dioxide in a system containing an organic layer and an aqueous solution and the absorption rates of carbon dioxide in a system without organic layer (T=25° C., P=1.0 atm, agitation speed=250 rpm).

FIG. 5 shows that the absorption rate of carbon dioxide in the first experiment was higher than that in the second experiment. Clearly, the sodium formate aqueous solution absorbed carbon dioxide faster in the presence of the liquid organic mixture than it did in the absence of it.

EXAMPLE 4

Absorption Rate of Carbon Dioxide in the Organic Mixture and in the Liquid Carrier The experiment shown in this example is not necessary in a real system. It was conducted to determine the effects of the transportation layer. Carbon dioxide absorption rates in a liquid carrier and in an organic mixture were measured individually under the same experimental conditions: T=25° C., p=1.0 atm, carbon dioxide concentration=99.9% by volume, agitation speeds=250 and 106 rpm (for two different runs). The liquid carrier was made of 300 ml of 400 g/L sodium formate aqueous solution and the organic mixture was 300 ml Alamine 336 and 2-ethylhexyl alcohol (1:1 ratio by volume).

Figure 6A:
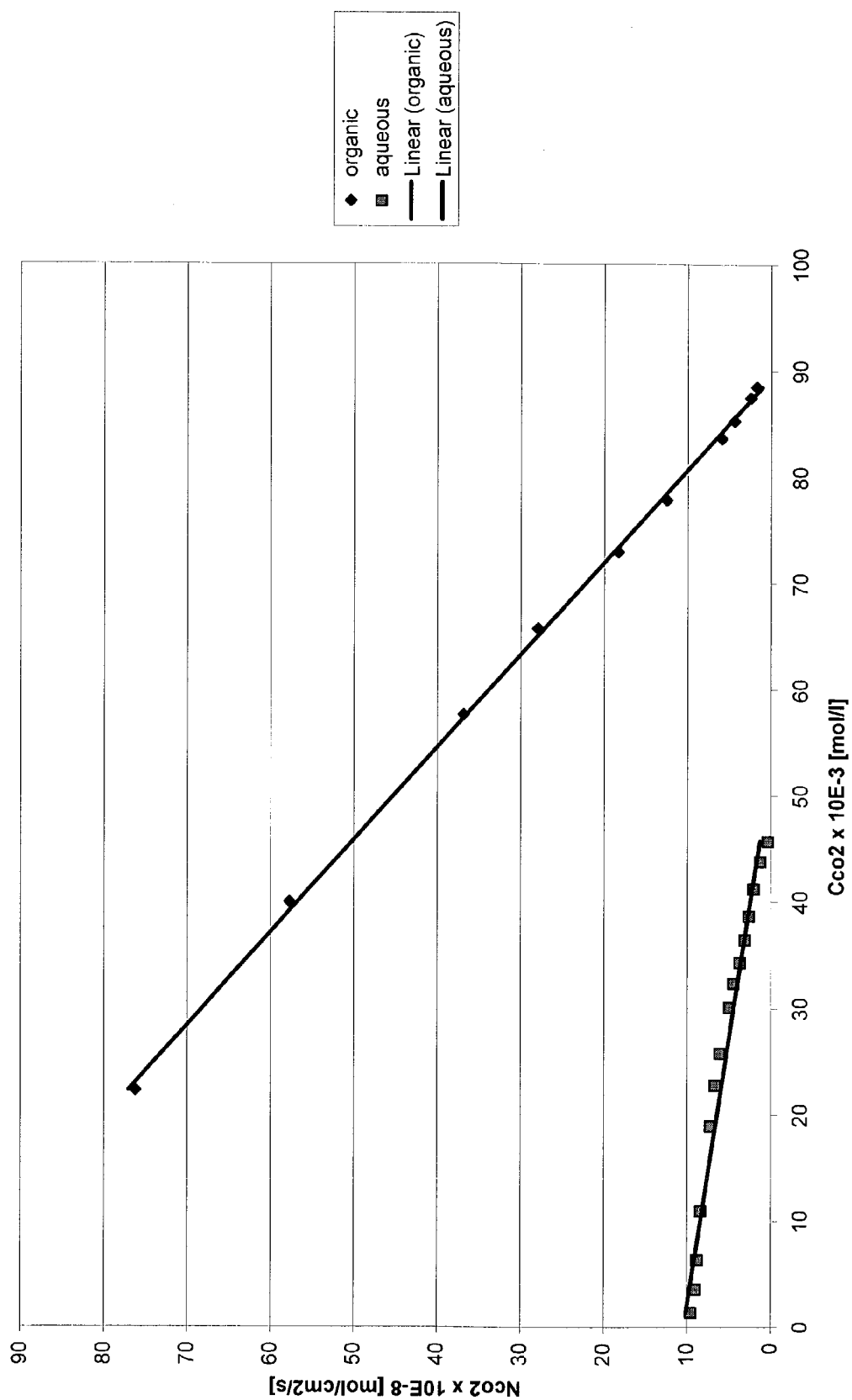
FIG. 6A shows the different absorption rates of carbon dioxide in the organic layer and in the aqueous solution (T=25° C., P=1.0 atm, V=300 ml, agitation speed=250 rpm).
Figure 6B:
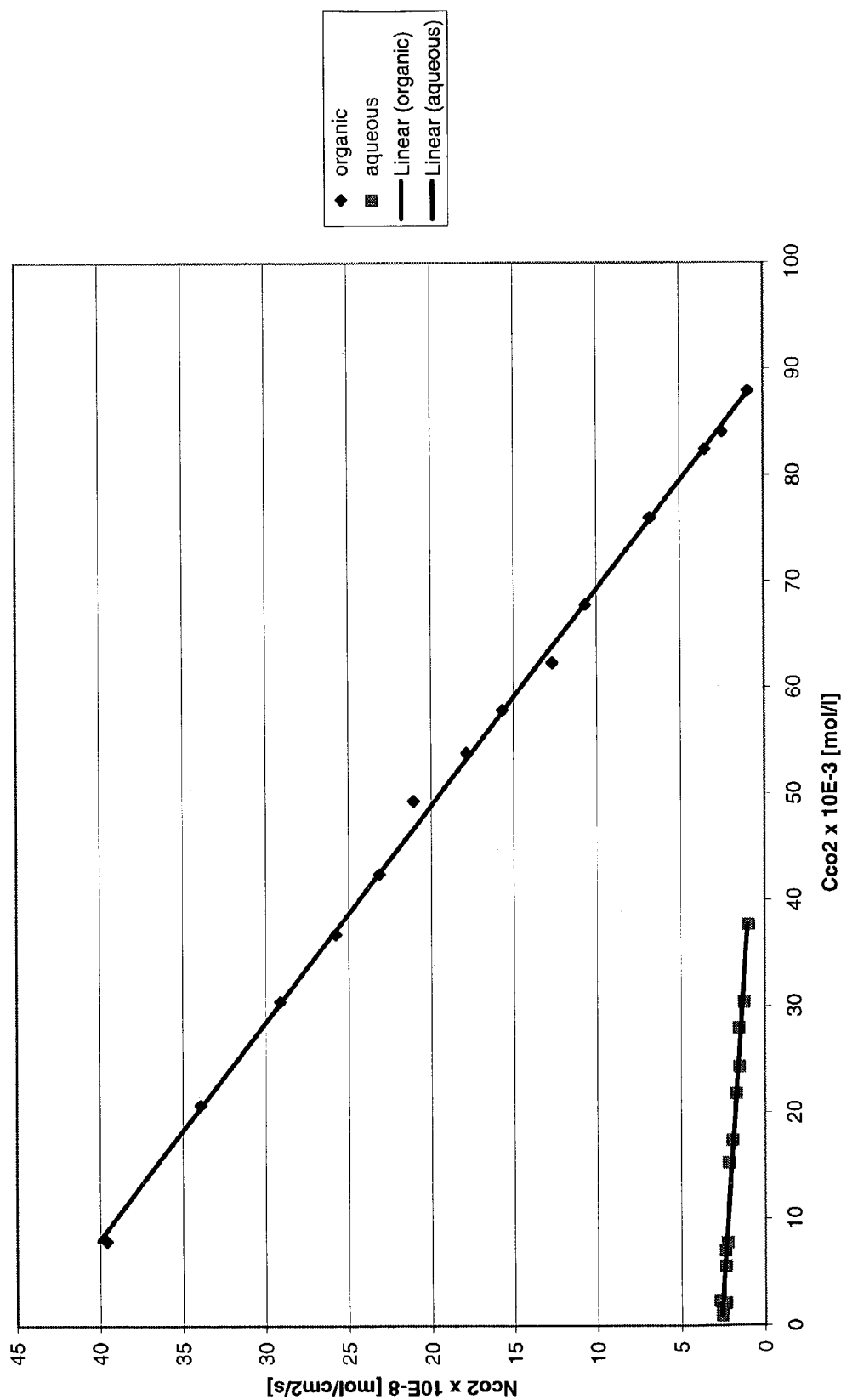
FIG. 6B shows the different absorption rates of carbon dioxide in the organic layer and in the aqueous solution (T=25° C., P=1.0 atm, V=300 ml, agitation speed=106 rpm).

The results from those experiments are shown in FIGS. 6A and 6B. Carbon dioxide was absorbed by the organic mixture much faster than it was by the liquid carrier. FIG. 6A shows different absorption rates for the two experiments performed with agitation speed being 250 rpm. FIG. 6B shows the result from the two experiments conducted at the agitation speed of 106 rpm. It can be seen that the absorption rate of carbon dioxide in the liquid organic mixture was about ten times more than that in the liquid carrier.

By comparing the absorption rates in FIGS. 6A and 6B, it is apparent that when both the liquid carrier and the organic mixture existed in the same gas-liquid absorption system, the slow absorption of carbon dioxide by the liquid carrier did not limit the rate at which carbon dioxide was absorbed under the experimental conditions.

Figure 7A:
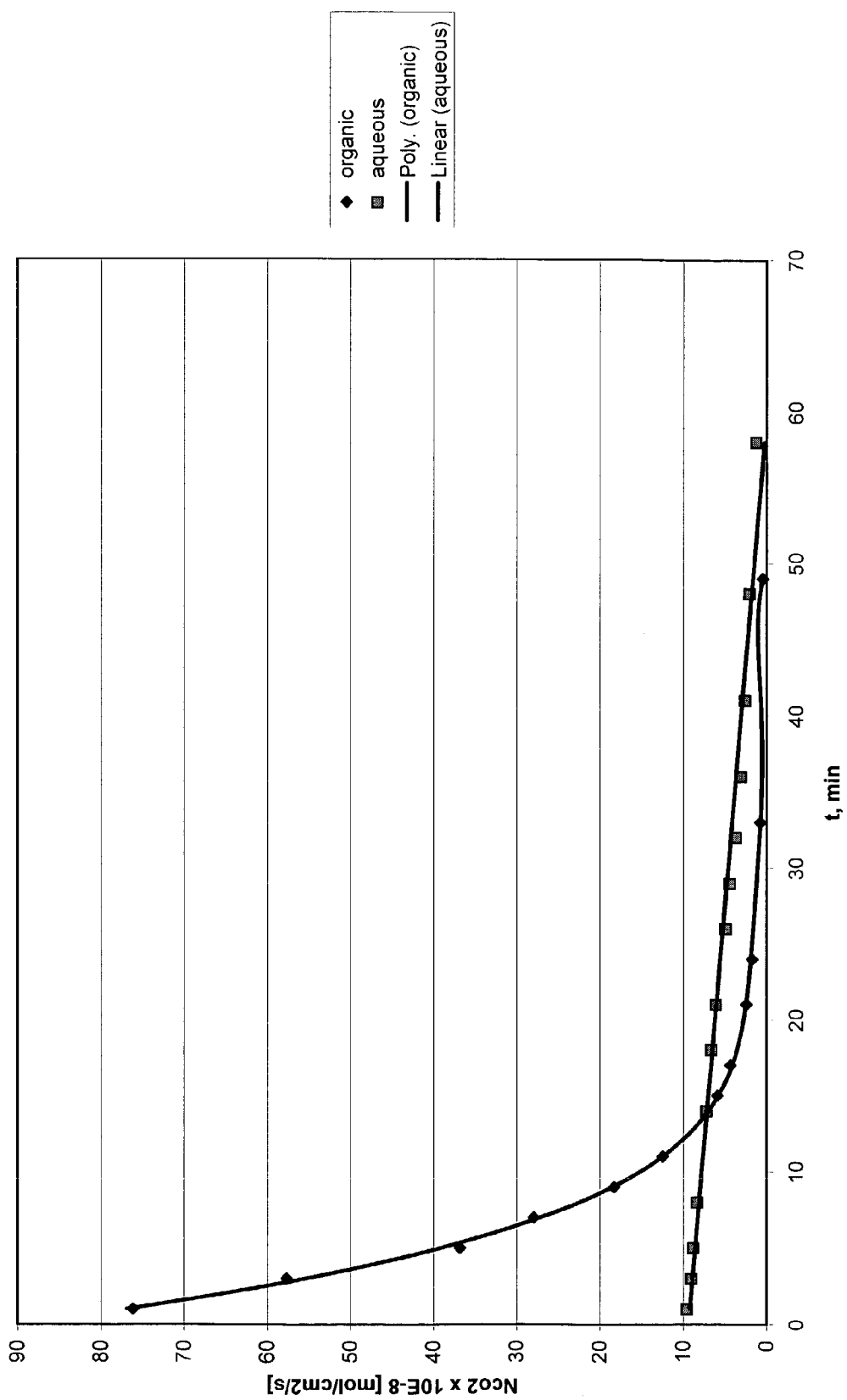
FIG. 7A shows the relationship between the absorption rate of carbon dioxide and the absorption time (T=25° C., P=1.0 atm, V=300 ml, agitation speed=250 rpm).
Figure 7B:
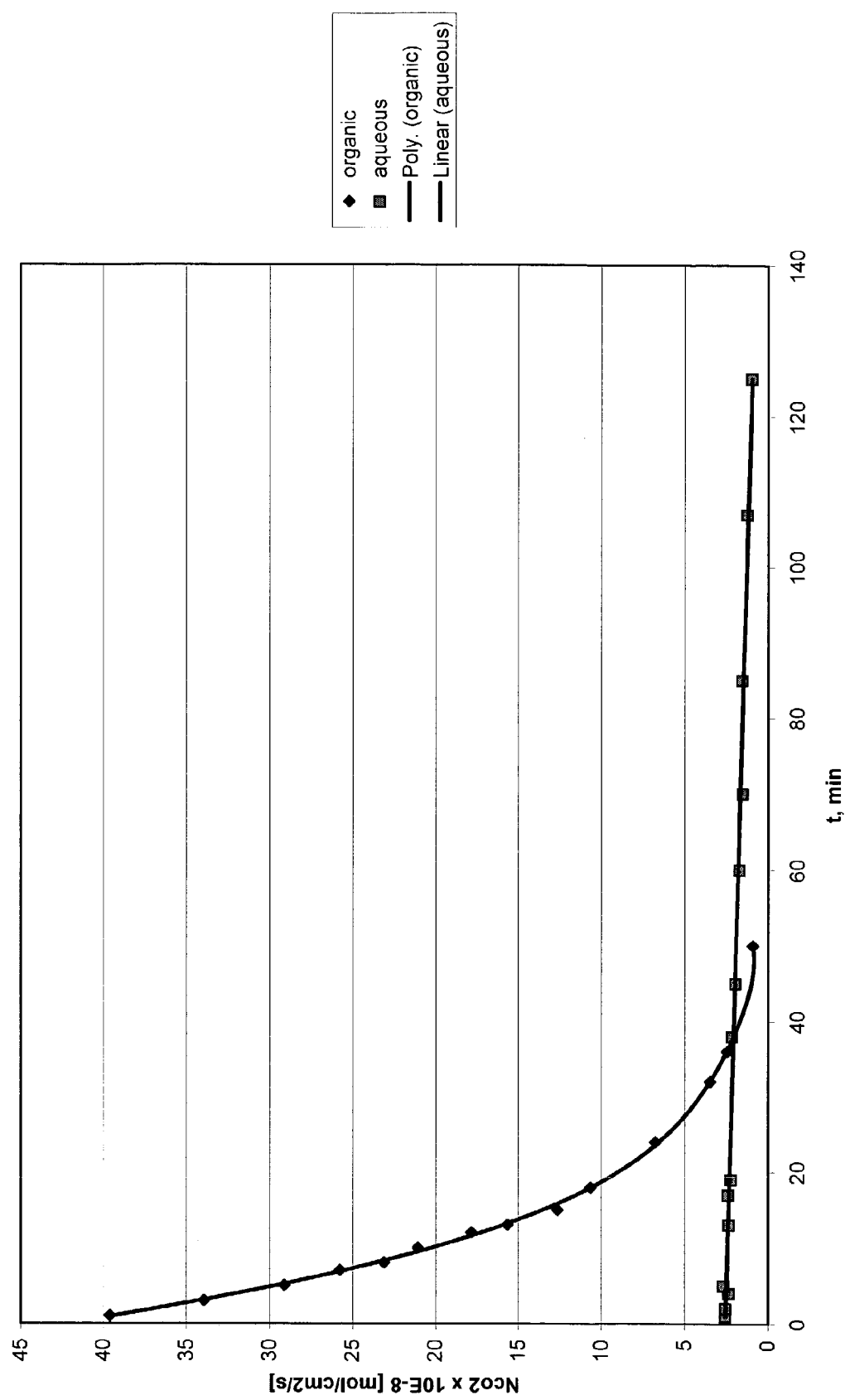
FIG. 7B shows the relationship between the absorption rate of carbon dioxide and the absorption time (T=25° C., P=1.0 atm, V=300 ml, agitation speed=106 rpm).

The relationship between the absorption rate of carbon dioxide and absorption time is shown in FIGS. 7A and 7B. It is obvious that carbon dioxide reached equilibrium in the liquid organic mixture much earlier than that in the liquid carrier. So, the organic mixture was saturated by carbon dioxide much earlier than by the liquid carrier when both existed in the same system.

The experimental results also shows that the mass transfer resistance of carbon dioxide in the organic mixture was much lower than that in the liquid carrier.

EXAMPLE 5

Carbon Dioxide Recovered in the Liquid Carrier

The experiment shown in this example is unnecessary in the real system. The experiment was conducted to determine whether carbon dioxide absorbed by the organic mixture was transferred into the liquid carrier.

Carbon dioxide and calcium chloride can form calcium bicarbonate, which has very low solubility. Therefore, when calcium chloride was added into the liquid carrier, the presence of the white deposit would be conclusive evidence showing the existence of the carbon dioxide in the liquid carrier because nothing else in the system could react with calcium chloride to form a white deposit.

$$CaCl_2 + 2\ CO_2 + 2H_2O \longleftrightarrow Ca(HCO_3)_2 + 2\ HCl$$

In this experiment, 300 ml organic mixture of Alamine 336 and 2-ethylhexyl alcohol (1:1 by volume) was added to the reaction vessel. Carbon dioxide was introduced into the reaction vessel by turning on the gas regulator, allowing the organic mixture to absorb carbon dioxide. The carbon dioxide flow was stopped after the organic mixture was saturated with carbon dioxide. Then, 80 ml calcium chloride solution at the concentration of 300 g/L was poured into the reaction vessel immediately. The liquid continued to be agitated at the rate of 300 rpm. The experiment was done at 25° C. and under 1.0 atm pressure. After about ten minutes of agitation, a large amount of white deposit appeared in the liquid carrier. This proved that carbon dioxide absorbed by the organic mixture was transferred into the liquid carrier where it reacted with calcium chloride to form the white deposit.

While the data was acquired in the specific experiments, many of the parameters can be varied to achieve the same or similar results.

In those exemplary embodiments of the invention, specific components, arrangements, and operating orders are used to describe the invention. Obvious changes, modifications, and substitutions may be made by those skilled in the art to achieve the same results of this invention. The exemplary embodiments are, of course, merely examples and are not intended to limit the scope of the invention. It is intended that the present invention cover all other embodiments that are within the scope of the appended claims and their equivalents.

What is claimed is:

1. A method for separating a gas from a gas mixture by absorbing it with a liquid carrier which is able to selectively absorb the gas, the method comprising:
   introducing a liquid carrier into a vessel through an inlet;
   introducing a liquid organic mixture into the vessel to form a liquid organic layer or small parcels between the gas and the liquid carrier, the liquid organic mixture being immiscible with the liquid carrier;
   introducing the gas mixture into the vessel through the inlet, allowing the liquid organic layer to absorb the gas and to convert it into absorbed gas; and
   allowing the liquid organic layer to transport the absorbed gas into the liquid carrier.

2. The method of claim 1, wherein the gas mixture contains about 99.99% of the gas by weight, and wherein the ratio of the liquid organic mixture to the liquid carrier is from 1/1000 to 1000/1 by volume, the method further comprising:
   maintaining the temperature of the vessel within the range from about 1° C. to about 500° C.; and
   collecting the gas from the liquid carrier in the vessel.

3. The method of claim 1, wherein the gas mixture contains about 99.99% of the gas by weight, the method further comprising collecting the gas from the liquid carrier in the vessel.

4. The method of claim 1, wherein the ratio of the liquid organic mixture to the liquid carrier is from about 1/100 to about 100/1 by volume; wherein the content of the gas is from about 0.001% to about 99.99% of the gas mixture by weight; wherein the liquid carrier is an aqueous solution; wherein the liquid organic layer is made of the members selected from the group consisting of alkane, alcohol, ether, ester, amine, and combinations thereof; and wherein the gas in the gas mixture is a member selected from the group consisting of $CO_2$, $SO_2$, $H_2S$, COS, and combinations thereof, the method further comprising:
   collecting the gas mixture from one of the inlets of the vessel; and
   agitating the liquid carrier to facilitate the absorbed gas to diffuse in the liquid carrier.

5. The method of claim 4 further comprising maintaining the temperature of the vessel within the range from about 5° C. to about 200° C.

6. The method of claim 1, wherein the ratio of the liquid organic mixture to the liquid carrier is from about 1/100 to about 100/1 by volume; wherein the content of the gas is from about 0.001% to about 99.99% of the gas mixture by weight; wherein the liquid carrier is an aqueous solution; wherein the liquid organic layer is made of the members selected from the group consisting of alkane, alcohol, ether, ester, amine, and combinations thereof; and wherein the gas in the gas mixture is a member selected from the group consisting of $CO_2$, $SO_2$, $H_2S$, COS, and combinations thereof, the method further comprising agitating the liquid carrier to facilitate the absorbed gas to diffuse in the liquid carrier.

7. The method of claim 1, wherein the ratio of the liquid organic mixture to the liquid carrier is from about 1/100 to about 100/1 by volume; wherein the liquid carrier is an aqueous solution; wherein the liquid organic layer is made of the members selected from the group consisting of alkane, alcohol, ether, ester, amine, and combinations thereof; and wherein the gas in the gas mixture is a member selected from the group consisting of $CO_2$, $SO_2$, $H_2S$, COS, and combinations thereof, the method further comprising collecting the gas mixture from one of the inlets of the vessel.

8. The method of claim 7 further comprising agitating the liquid carrier to facilitate the absorbed gas to diffuse in the liquid carrier.

9. The method of claim 1, wherein the ratio of the liquid organic mixture to the liquid carrier is from about 1/100 to about 100/1 by volume, the method further comprising:
   agitating the liquid carrier to facilitate the absorbed gas to diffuse in the liquid carrier; and
   maintaining the temperature of the vessel within the range from about 5° C. to about 200° C.

10. The method of claim 1, wherein the ratio of the liquid organic mixture to the liquid carrier is from about 1/100 to about 100/1 by volume, the method further comprising maintaining the temperature of the vessel within the range from about 5° C. to about 200° C.

11. The method of claim 1, wherein the content of the gas is from about 0.001% to about 99.99% of the gas mixture by weight; wherein the liquid carrier is an aqueous solution; wherein the liquid organic layer is made of the members selected from the group consisting of alkane, alcohol, ether, ester, amine, and combinations thereof; wherein the gas in the gas mixture is a member selected from the group consisting of $CO_2$, $SO_2$, $H_2S$, COS, and combinations thereof; and wherein the liquid organic layer is from about 0.1 mm to about 50 cm in its thickness, the method further comprising:
   collecting the gas mixture from one of the inlets of the vessel; and
   agitating the liquid carrier to facilitate the absorbed gas to diffuse in the liquid carrier.

12. The method of claim 11 further comprising maintaining the temperature of the vessel within the range from about 5° C. to about 200° C.

13. The method of claim 1, wherein the content of the gas is from about 0.001% to about 99.99% of the gas mixture by weight; wherein the liquid carrier is an aqueous solution; wherein the liquid organic layer is made of the members selected from the group consisting of alkane, alcohol, ether, ester, amine, and combinations thereof; wherein the gas in the gas mixture is a member selected from the group consisting of $CO_2$, $SO_2$, $H_2S$, COS, and combinations thereof; and wherein the liquid organic layer is from about 0.1 mm to about 50 cm in its thickness, the method further comprising agitating the liquid carrier to facilitate the absorbed gas to diffuse in the liquid carrier.

14. The method of claim 1, wherein the content of the gas is from about 0.001% to about 99.99% of the gas mixture by weight, and wherein the liquid organic layer is from about 0.1 mm to about 50 cm in its thickness, the method further comprising collecting the gas mixture from one of the inlets of the vessel.

15. The method of claim 14 further comprising agitating the liquid carrier to facilitate the absorbed as to diffuse in the liquid carrier.

16. The method of claim 1, wherein the content of the gas is from about 0.001% to about 99.99% of the gas mixture by weight, the method further comprising:
   agitating the liquid carrier to facilitate the absorbed gas to diffuse in the liquid carrier; and
   maintaining the temperature of the vessel within the range from about 5° C. to about 200° C.

17. The method of claim 1, wherein the content of the gas is from about 0.001% to about 99.99% of the gas mixture by weight, the method further comprising maintaining the temperature of the vessel within the range from about 5° C. to about 200° C.

18. The method of claim 1, wherein the liquid carrier is an aqueous solution; wherein the liquid organic layer is made of the members selected from the group consisting of alkane alcohol, ether, ester, amine, and combinations thereof; wherein the gas in the gas mixture is a member selected from the group consisting of $CO_2$, $SO_2$, $H_2S$, COS, and combinations thereof; and wherein the liquid organic layer is from about 0.1 mm to about 50 cm in its thickness, the method further comprising:
   collecting the gas mixture from one of the inlets of the vessel;
   agitating the liquid carrier to facilitate the absorbed gas to diffuse in the liquid carrier; and
   maintaining the temperature of the vessel within the range from about 5° C. to about 200° C.

19. The method of claim 1, wherein the liquid carrier is an aqueous solution; wherein the liquid organic layer is made of the members selected from the group consisting of alkane, alcohol, ether, ester, amine, and combinations thereof; wherein the gas in the gas mixture is a member selected from the group consisting of $CO_2$, $SO_2$, $H_2S$, COS, and combinations thereof; and wherein the liquid organic layer is from about 0.1 mm to about 50 cm in its thickness, the method further comprising:
   collecting the gas mixture from one of the inlets of the vessel; and
   maintaining the temperature of the vessel within the range from about 5° C. to about 200° C.

20. The method of claim 1, wherein the liquid carrier is an aqueous solution; wherein the liquid organic layer is made of the members selected from the group consisting of alkane, alcohol, ether, ester, amine, and combinations thereof; and wherein the gas in the gas mixture is a member selected from the group consisting of $CO_2$, $SO_2$, $H_2S$, COS, and combinations thereof, the method further comprising:
   collecting the gas mixture from one of the inlets of the vessel; and
   maintaining the temperature of the vessel within the range from about 5° C. to about 200° C.

21. The method of claim 1 wherein the liquid organic layer is from about 0.1 mm to about 50 cm in its thickness.

22. The method of claim 21 further comprising collecting the gas mixture from one of the inlets of the vessel.

23. The method of claim 1 further comprising:
   collecting the gas mixture from one of the inlets of the vessel;
   agitating the liquid carrier to facilitate the absorbed gas to diffuse in the liquid carrier; and
   maintaining the temperature of the vessel within the range from about 5° C. to about 200° C.

24. The method of claim 1 further comprising agitating the liquid carrier to facilitate the absorbed gas to diffuse in the liquid carrier.

25. The method of claim 24 further comprising maintaining the temperature of the vessel within the range from about 5° C. to about 200° C.

26. A system for separating a gas from a gas mixture by absorbing the gas by a liquid carrier which is able to selectively absorb the gas, the system comprising:
   a closed vessel having at least one inlet;
   a gas mixture in the vessel;
   a liquid carrier in the vessel; and
   an organic mixture which exists as a layer or small parcels between the gas mixture and the liquid carrier, the organic mixture being immiscible with the liquid carrier and being able to transport the gas from the gas mixture into the liquid carrier.

27. The system of claim 26 wherein the liquid carrier is an aqueous solution; wherein the liquid organic layer is made of the members selected from the group consisting of alkane, alcohol, ether, ester, amine, and combinations thereof; and wherein the gas in the gas mixture is a member selected from the group consisting of $CO_2$, $SO_2$, $H_2S$, COS, and combinations thereof.

28. The system of claim 27 further comprising:
   means for adjusting and maintaining the pressure of the system;
   means for adjusting and maintaining the temperature of the system;
   means for regulating the entry of the gas mixture through one of the inlets; and
   means for monitoring the flow rate of gas mixture entering the inlet.

29. The system of claim 26 wherein the gas to be absorbed is $CO_2$ at concentration from about 0.001 to about 99.9% of the gas mixture by volume, wherein the liquid carrier is a sodium formate aqueous solution, and wherein the liquid organic layer is an organic mixture of Tri-C8-C10-Alkyl amines and 2-ethylhexyl alcohol at a ratio from 100/1 to 1/100 by volume.

30. The system of claim 29 further comprising:
   means for adjusting and maintaining the pressure of the system;
   means for adjusting and maintaining the temperature of the system;
   means for regulating the entry of the gas mixture through one of the inlets; and
   means for monitoring the flow rate of gas mixture entering the inlet.

31. The system of claim 26 further comprising:
   means for adjusting and maintaining the pressure of the system; and
   means for adjusting and maintaining the temperature of the system.

32. The system of claim 26 further comprising:
means for regulating the entry of the gas mixture through one of the inlets; and
means for monitoring the flow rate of gas mixture entering the inlet.

33. The system of claim 26 further comprising means for agitating the liquid carrier and the gas mixture.

34. A method for separating a gas from a gas mixture by absorbing it with a liquid carrier which is able to selectively absorb the gas, the method comprising:
introducing a liquid carrier in a vessel containing at least one inlet;
introducing a second liquid into the vessel, the second liquid being immiscible with the liquid carrier;
introducing the gas mixture into the vessel through the inlet, allowing the second liquid to absorb the gas and to convert it into absorbed gas; and
allowing the second liquid to transport the absorbed gas into the liquid carrier.

35. The method of claim 34 further comprising releasing the absorbed gas and collecting it.

36. The method of claim 34 further comprising maintaining the temperature of the vessel within the range from about 1° C. to about 500° C.

37. The method of claim 36 further comprising agitating the liquid carrier to facilitate the absorbed gas to diffuse in the liquid carrier.

38. The method of claim 34 further comprising agitating the liquid carrier to facilitate the absorbed gas to diffuse in the liquid carrier.

* * * * *